United States Patent [19]

Lysanov et al.

[11] 4,349,517

[45] Sep. 14, 1982

[54] METHOD OF PRODUCING CUBIC BORON NITRIDE

[76] Inventors: Vladislav S. Lysanov, ulitsa Vyvilovykh, 8/1, kv. 422; Viktor V. Digonsky, prospekt Dobroljubova, 5, kv. 31; Leon I. Feldgun, ulitsa S. Kovalevskoi, 14/3, kv. 91; Valery M. Davidenko, ulitsa Marshala Govorova, 14, kv. 19, all of Leningrad; Nikolai V. Novikov, ulitsa A. Barbjusa, 22/26, kv. 125, Kiev; Alexandr I. Borimsky, Vyshgorodskaya ulitsa, 68/2, kv. 55, Kiev; Alexandr A. Shulzhenko, Novokonstantinovskaya ulitsa, 7, kv. 48, Kiev; Valerian D. Yakimenko, Polyarnaya ulitsa, 5-a, kv. 193, Kiev; Eduard Y. Dovgal, Drezdenskaya ulitsa 12, kv. 48, Leningrad; Vitaly Y. Egorov, ulitsa Komissara Smirnova, 15, kv. 89, Leningrad; Vyacheslav S. Rovsha, prospekt Shvernika, 14, kv. 193, Leningrad; Alexei I. Prikhna, Vyshgorodskaya ulitsa 76-a, kv. 39; Alexandr N. Sokolov, Radomyshlenskaya ulitsa, 25, kv. 67, both of Kiev, all of U.S.S.R.

[21] Appl. No.: 199,273

[22] Filed: Oct. 21, 1980

[51] Int. Cl.³ .............................................. C01B 35/14
[52] U.S. Cl. ....................................... 423/290; 51/307
[58] Field of Search .......................... 423/290; 51/307

[56] References Cited

U.S. PATENT DOCUMENTS 2,947,617  8/1960  Wentorf, Jr. .
3,150,929  9/1964  Wentorf, Jr. .
3,701,826 10/1972  De Vries .
3,743,489  7/1973  Wentorf, Jr. .
3,772,428 11/1973  De Vries .
3,881,890  5/1975  Birle .
3,959,443  5/1976  Kabayama .
4,016,244  4/1977  Susa et al. ............................ 423/290

FOREIGN PATENT DOCUMENTS 2116020  4/1972  Fed. Rep. of Germany ........ 51/307
2083234 12/1971  France ................................ 423/290
1316045  4/1971  United Kingdom .
1329345  4/1971  United Kingdom .
1335909  4/1971  United Kingdom .

OTHER PUBLICATIONS

Kobayashi et al, "Mat. Res. Bull.", vol. 10, 1975, pp. 1231–1236.

Primary Examiner—G. O. Peters
Attorney, Agent, or Firm—Fleit & Jacobson

[57] ABSTRACT

Disclosed is a method of producing cubic boron nitride, which comprises the steps of subjecting to a pressure of from 40 to 70 kilobars and to a temperature of from 1100° to 2000° C. a charge including hexagonal boron nitride and a conversion initiator selected from the group consisting of alkali and alkaline earth metals and borides of the foregoing metals, doping the charge with crystallohydrate in the form of a compound selected from the group consisting of sulfur-, halogen- or nitrogen-containing salts and their mixtures incorporating at least 5 molecules of crystallization water. According to another embodiment, the aforesaid charge is doped with a member selected from the group consisting of alkali metal hydroxide or alkaline earth metal hydroxide.

8 Claims, No Drawings

METHOD OF PRODUCING CUBIC BORON NITRIDE

FIELD OF THE INVENTION

The present invention is concerned in general with the production of superhard materials, and more specifically relates to an improved method of producing cubic boron nitride ($\beta$—BN), which finds extensive application, for example, in the abrasive industry for manufacturing tools possessing high resistance when grinding chilled steels and difficult-to-machine alloys.

BACKGROUND OF THE INVENTION

In the prior art there is known a variety of methods for the production of cubic boron nitride ($\beta$—BN), which comprise subjecting hexagonal boron nitride ($\alpha$—BN) to an elevated temperature and pressure in the presence of at least one catalyst selected from the class consisting of alkali metals, alkaline earth metals, and nitrides of the foregoing metals (see, for example, U.S. Pat. No. 2,947,617 patented on Jan. 6, 1958).

The cubic boron nitride produced by these methods does not exhibit a sufficiently high level of strength, especially in moist media, due to the formation of considerable amounts of by-products located in the grains of cubic boron nitride, in particular, the nitrides of a catalytic metal, arising in the process of synthesis, are especially susceptible to the effect of moisture.

Furthermore, the process of manufacture of abrasive articles from the cubic boron nitride produced by the above prior art methods is accompanied by partial destruction of cubic boron nitride grains and of the abrasive product itself on account of the tendency of nitrides of a catalytic metal to oxidation.

According to the currently adopted terminology the substances which are conductive to the formation of cubic boron nitride are called catalysts. However, in the final product, i.e. cubic boron nitride, these substances are not encountered in pure form, therefore, the substances favoring the formation of cubic boron nitride will be hereinafter referred to as "initiators".

Known in the prior art is a method of producing cubic boron nitride at elevated temperatures and pressures from charges including hexagonal boron nitride and conversion initiators, the latter being comprised of borides of alkali and/or alkaline earth metals taken in combination or separately (see, for example, U.K. Pat. No. 1,335,909 patented on Apr. 19, 1971).

When practicing the above-described method for the production of cubic boron nitride, the yield of a target product in the form of a powder with a grain size of more than 100 mcm, micrometer, (this is the type of powders being most extensively utilized for the manufacture of abrasive tools) amounts all in all to about 20%.

Also known in the prior art is a method of producing cubic boron nitride, which comprises mixing hexagonal boron nitride with 0.5 to 7 weight percent of a member selected from the group consisting of phosphorus, a phosphorus compound and mixtures of at least two such materials, subjecting the resulting mixture to elevated temperatures and pressures, under which the cubic crystalline boron nitride structure is stable, and sequentially reducing the temperature and lowering the pressure of said mixture, lithium hydride and lithium nitride being used as a conversion initiator (see, for example, U.S. Pat. No. 3,881,890 patented on Apr. 20, 1973).

The use of the foregoing materials decomposable in air as a conversion initiator involves significant complexities in the preparation of an initial charge for cubic boron nitride synthesis and does not afford the possibility of mechanizing the procedure of charge preparation in the conditions of commercial manufacture. Moreover, in order to obtain an adequately high yield of commercially desirable powders with a grain size of more than 100 mcm there is required a fairly protracted synthesis time interval (up to 20 min).

The completeness of conversion of hexagonal boron nitride to cubic boron nitride as well as the number of crystals with a grain size of more than 100 mcm can be augmented, provided the crystallization medium is transformed in conformity with the present invention.

SUMMARY OF THE INVENTION

It is an object of the present invention to provide a method of producing cubic boron nitride which enables to increase the degree of converting hexagonal boron nitride to cubic boron nitride, i.e. to improve the yield of a target product.

Another object of the preset invention is to provide a method of producing cubic boron nitride, which allows to step up the yield of powders with a grain size of more than 100 mcm.

These and other objects of the present invention are accomplished by the provision of a method of producing cubic boron nitride, which comprises subjecting a charge including hexagonal boron nitride and a conversion initiator, such as alkali or alkaline earth metals, or borides of alkali and/or alkaline earth metals, to a pressure of 40 to 70 kilobars and to a temperature of 1100° to 2000° C., wherein according to the invention, the charge is doped with a member in the form of crystallohydrate consisting of a sulfur- and/or halogen- and/or nitrogen-containing salt and incorporating at least 5 molecules of crystallization water.

On the basis of theoretical and experimental evidence it has been found that doping the charge with crystallohydrate including such a salt and incorporating at least 5 molecules of crystallization water promotes a decrease in the number of crystallization centers, providing thereby optimum conditions for the formation of large cubic boron nitride crystals, and conduces to an increase in the yield of a terget product, i.e. cubic boron nitride.

The stated lower limit of the number of crystallization water molecules insures a minimum permissible increase in the crystallization rate of cubic boron nitride and has a considerable effect on its yield.

The upper limit of the number of crystallization water molecules is not restricted inasmuch as the amount of crystallohydrate introduced into the charge depends on the amount of water contained therein.

It is advisable to use as a sulfur-containing salt at least one of the compounds selected from the group consisting of sulfate, thiosulfate, sulfide and sulfite, since the foregoing compounds do not lose crystallization water at the temperature of initial ingredients drying, which enables to stabilize the process of cubic boron nitride synthesis.

According to one of the embodiments of the invention, it is advisable that the charge be additionally doped with a member selected from the group consisting of alkali and alkaline earth metal hydroxides.

According to another embodiment of the invention, it is advisable that the charge be doped with crystallohydrate in the form of an aqueous solution, which enables to achieve a uniform distribution or crystallohydrate over the entire volume of the charge.

It has been found that the incorporation in the charge of alkali or alkaline earth metal hydroxide leads to the formation of ammonia. The formation of ammonia takes place upon the interaction of molten hydroxide with hexagonal boron nitride in the conditions of cubic boron nitride synthesis. Due to the fact that the high-pressure chamber in which the synthesis of cubic boron nitride is not sealed in regard to the gas, the major portion of ammonia comes out of the reaction vessel.

Crystallohydrates, such as calcium bromide, aluminum iodide, magnesium chloride and others, adsorb ammonia in the melt or solution. The combined application of hydroxides and crystallohydrates conduces to the formation of ammonia and to its retention within the reaction vessel, which ensures upon synthesis an increase in the amount of cubic boron nitride powders of the desired grain size.

It is advisable that the charge subjected to the above-described treatment have the following composition in mass %:

| | |
|---|---|
| hexagonal boron nitride | 72.0 to 94.0 |
| conversion initiator | 5.0 to 20.0 |
| crystallohydrate | 1.0 to 8.0 |

According to another embodiment, it is advisable that the charge subjected to the above-described treatment have the following composition in mass %:

| | |
|---|---|
| hexagonal boron nitride | 75.5 to 93.5 |
| conversion initiator | 5.0 to 15.0 |
| crystallohydrate | 1.0 to 5.0 |
| hydroxide | 0.5 to 4.5 |

In the capacity of a conversion initiator use is made, for example, of magnesium and/or magnesium boride.

The stated lower limit of the conversion initiator ensures a minimum permissible degree of conversion of hexagonal boron nitride to cubic boron nitride, while the content of the conversion initiator in excess of 20 mass % drastically increases the degree of conversion, but at the same time sharply reduces the amount of cubic boron nitride powders with a grain size of more than 100 mcm.

The lower limit of the crystallohydrate ensures influence on the increased amount of cubic boron nitride powders of the desired grain size.

An increase in the concentration of the crystallohydrate in excess of 5 mass % leads to a decrease in the degree of conversion of hexagonal boron nitride to the cubic modification.

The lower limit of the concentration of the alkali or alkaline earth metal hydroxide ensures a minimum surplus concentration of ammonia in the reaction composition and exerts a marked effect on an increase in the yield of cubic boron nitride powders with a large grain size. An increase in the content of the alkali or alkaline earth metal hydroxide in the reaction composition in excess of 4.5 mass % leads to a drastic decrease in the total amount of cubic boron nitride obtained in the synthesis.

The stated lower and upper limits of the hexagonal boron nitride concentration are determined by the adopted amount of the remaining components.

The foregoing and other objects as well as novel features of the present invention are defined in the appended claims, while the nature of the invention will be more evident from a consideration of the following detailed description of its embodiments.

DETAILED DESCRIPTION OF THE INVENTION

The proposed method of producing cubic boron nitride can be realized as follows.

The starting charge consisting of powdery hexagonal boron nitride and a conversion initiator, e.g. alkali or alkaline earth metal or borides of these metals, is mixed with a dope in the form of crystallohydrate consisting of sulfur- and/or halogen-, and/or nitrogen-containing salts and incorporation at least 5 molecules of crystallization water. The upper limit of the crystallization water is not limited since the amount of the crystallohydrate depends on the amount of water contained therein. A powder of the initial charge can be mixed with crystallohydrate aqueous solutions. In the capacity of crystallohydrate comprising a sulfur-containing salt there may be used sulfates, thiosulfates, sulfites and sulfides. In the capacity of crystallohydrate comprising a halogen-containing salt there may be used chlorides, iodides and bromides, and in the capacity of crystallohydrate comprising a nitrogen-containing salt there may be used, for example, nitrates.

According to another embodiment of the invention, the charge is additionally doped with a member selected from the group consisting of alkali and alkaline earth metal hydroxides, e.g. an aqueous solution of NaOH or Ca/OH/$_2$.

The crystallohydrate or hydroxide is dissolved in such an amount of water which is related to the weight of hexagonal boron nitride moistened thereby as 2 to 1.

After the mixing procedure insuring a uniform distribution of the dope over the entire volume of the hexagonal boron nitride powder, the resulting mixtures are dried at a temperature of 60° to 120° C. The lower temperature limit is the temperature at which the crystallohydrate does not lose crystallization water and the process of synthesis proceeds in a stable manner.

The procedures of mixing and drying are performed for 1-2 hours, which is sufficient to achieve a uniform distribution of all of the components over the charge volume.

The mixture is pressed into a pill which is placed in the reaction chamber and subjected to a pressure of 40 to 70 kilobars and to a temperature of 1100° to 2000° C. for 1-10 minutes. The synthesis can be carried out on a high pressure and temperature unit of any design enabling to secure the required parameters.

The parameters of the synthesis process, the quantitative ratios of the initial charge and the amount of the resulting cubic boron nitride are presented in the table below.

The realization of the method of producing cubic boron nitride as described hereinabove makes it possible to increase the yield of cubic boron nitride by 10-30%, while the amount of cubic boron nitride powders of a grain size of more than 100 mcm is practically doubled as compared to the known method.

Further are presented typical examples illustrating certain aspects of the present invention and revealing more lucidly its salient features and advantages, these examples are summarized in a table.

While describing the foregoing various embodiments of the present invention a particular set of specialized terms has been employed to provide better clarity. However, it is to be understood that the present invention is by no means limited by the terminology accepted hereinabove and that each of the terms covers all of the equivalent elements performing the same function and used to accomplish the same objects.

While the present invention has been described hereinabove with reference being made to the particular preferred embodiments thereof it is to be understood by those skilled in the art that there may be introduced a number of insignificant variations and modifications into the manner of conducting the procedures incorporated in the method of producing cubic boron nitride without departing from the nature of the invention.

All such variations and modifications are not considered to be beyond the scope and spirit of the invention defined by the appended claims.

| No. No. | α-BN | Mg | MgB$_2$ | Al$_2$(SO$_4$)$_3$·18H$_2$O | AlK(SO$_4$)$_2$·12H$_2$O | Na$_2$SO$_3$·7H$_2$O | Na$_2$S$_2$O$_3$·5H$_2$O | K$_2$S·5H$_2$O | Mg(NO$_3$)$_2$·6H$_2$O | Al(NO$_3$)$_3$·9H$_2$O | MgCl$_2$·6H$_2$O | CaBr$_2$·6H$_2$O | AlJ$_3$·6H$_2$O | NaOH | Ca(OH)$_2$ | P, kbars | t, °C | Yield -BN, % (increase) | Total | Fractions +100 mem |
|---|---|---|---|---|---|---|---|---|---|---|---|---|---|---|---|---|---|---|---|---|
| 1. | 82.9 | 13.0 | — | 4.1 | — | — | — | — | — | — | — | — | — | — | — | 44 | 1400 | 120 | 78 | 44 |
| 2. | 82.0 | 13.0 | — | — | 5.0 | — | — | — | — | — | — | — | — | — | — | 45 | 1450 | 117 | 74 | 43 |
| 3. | 83.5 | 13.0 | — | — | — | 3.5 | — | — | — | — | — | — | — | — | — | 44 | 1350 | 115 | 75 | 42 |
| 4. | 82.3 | 13.0 | — | — | — | — | 4.7 | — | — | — | — | — | — | — | — | 45 | 1500 | 112 | 70 | 40 |
| 5. | 81.7 | 13.0 | — | — | — | — | — | 5.3 | — | — | — | — | — | — | — | 43 | 1250 | 113 | 62 | 45 |
| 6. | 83.6 | 13.0 | — | — | — | — | — | — | 3.4 | — | — | — | — | — | — | 45 | 1500 | 110 | 64 | 44 |
| 7. | 83.7 | 13.0 | — | — | — | — | — | — | — | 3.3 | — | — | — | — | — | 46 | 1500 | 110 | 66 | 47 |
| 8. | 93.1 | 5.0 | — | — | 1.9 | — | — | — | — | — | — | — | — | — | — | 50 | 1800 | 112 | 68 | 38 |
| 9. | 72.3 | 20.0 | — | — | 7.7 | — | — | — | — | — | — | — | — | — | — | 40 | 1100 | 130 | 70 | 49 |
| 10. | 88.7 | 8.0 | — | — | — | — | — | — | — | 3.3 | — | — | — | — | — | 70 | 1950 | 115 | 62 | 33 |
| 11. | 82.6 | 13.0 | — | 2.0 | — | 2.4 | — | — | — | — | — | — | — | — | — | 43 | 1300 | 120 | 70 | 46 |
| 12. | 82.7 | 13.0 | — | — | 2.7 | — | — | — | 1.6 | — | — | — | — | — | — | 43 | 1250 | 118 | 68 | 45 |
| 13. | 87.3 | 10.0 | — | — | — | 1.3 | — | — | 1.4 | — | — | — | — | — | — | 43 | 1350 | 116 | 65 | 45 |
| 14. | 86.4 | 8.0 | — | — | — | — | — | — | — | — | 5.6 | — | — | — | — | 45 | 1450 | 115 | 82 | 46 |
| 15. | 84.0 | 8.0 | — | — | — | — | — | — | — | — | — | 8.0 | — | — | — | 46 | 1600 | 110 | 76 | 48 |
| 16. | 82.1 | 10.0 | — | — | — | — | — | — | — | — | — | — | 7.9 | — | — | 46 | 1600 | 118 | 75 | 42 |
| 17. | 86.5 | 9.0 | — | — | — | — | — | — | — | — | 3.0 | — | — | 1.0 | — | 44 | 1400 | 112 | 84 | 50 |
| 18. | 78.5 | 13.0 | — | — | — | — | — | — | — | — | 4.0 | — | — | — | 4.5 | 45 | 1450 | 115 | 84 | 50 |
| 19. | 79.5 | 13.0 | — | — | 1.5 | — | — | — | — | — | 6.0 | — | — | — | — | 45 | 1350 | 118 | 78 | 52 |
| 20. | 81.5 | 13.0 | — | — | — | — | — | — | 2.0 | — | 3.0 | — | — | 0.5 | — | 44 | 1600 | 113 | 79 | 49 |
| 21. | 81.5 | 10.0 | 5.0 | — | — | — | — | — | 3.5 | — | — | — | — | — | — | 46 | 1550 | 116 | 75 | 50 |
| 22. | 83.8 | — | 15.0 | — | — | — | — | — | 1.2 | — | — | — | — | — | — | 45 | 1500 | 112 | 76 | 45 |
| 23. | 82.3 | — | 15.0 | — | 1.1 | — | — | — | — | — | 3.0 | — | — | — | — | 44 | 1350 | 114 | 72 | 48 |
| 24. | 83.9 | — | 15.0 | — | — | — | — | — | — | — | — | — | — | — | — | 46 | 1550 | 110 | 67 | 46 |
| 25. | 81.5 | — | 15.0 | — | — | — | — | — | — | — | 3.0 | — | — | — | — | 45 | 1450 | 115 | 70 | 50 |

What is claimed is:

1. A method of producing cubic boron nitride comprising:
   subjecting to a pressure of 40 to 70 kilobars and a temperature of 1100° to 2000° C. a charge comprising hexagonal boron nitride and a conversion initiator selected from the group consisting of an alkali metal, an alkaline earth metal and borides of the aforesaid metals;
   doping the aforesaid charge with a hydrated salt containing an element selected from the group consisting of sulfur, halogen and nitrogen, said hydrated salt incorporating at least 5 molecules of water of hydration.

2. A method according to claim 1, wherein the sulfur-containing salt is comprised of at least one of the compounds selected from the group consisting of sulfate, thiosulfate, sulfite and sulfide.

3. A method according to claim 1, wherein the aforesaid charge is doped with a member selected from the group consisting of an alkali metal hydroxide and an alkaline earth metal hydroxide.

4. A method according to claim 1, wherein the aforesaid charge is doped with the hydrated salt by mixing the charge with an aqueous solution of the hydrated salt, and drying the mixture at a temperature below which the hydrated salt will dehydrate.

5. A method according to claim 1, wherein the charge subjected to the aforesaid effect of pressure and temperature has the following formulation in mass %:

| hexagonal boron nitride | 72.0 to 94.0 |
|---|---|
| conversion initiator | 5.0 to 20.0 |
| hydrated salt | 1.0 to 8.0. |

6. A method according to claim 1, wherein the charge subjected to the aforesaid effect of pressure and temperature has the following formulation in mass %:

| hexagonal boron nitride | 75.5 to 93.5 |
|---|---|
| conversion initiator | 5.0 to 15.0 |
| hydrated salt | 1.0 to 5.0 |
| hydroxide | 0.5 to 4.5. |

7. A method according to claim 3, wherein the hydrated salt is a hydrated halogen salt.

8. A method according to claim 7, wherein the halogen salt is selected from the group consisting of calcium bromide, aluminum iodide, and magnesium chloride.

* * * * *